United States Patent [19]

Ahrweiler

[11] 4,043,732

[45] Aug. 23, 1977

[54] PRESS FOR EXERTING FLAT PRESSURE

[75] Inventor: Karl-Heinz Ahrweiler, Krefeld, Germany

[73] Assignee: Eduard Kusters, Krefeld-Forstwald, Germany

[21] Appl. No.: 643,079

[22] Filed: Dec. 22, 1975

[30] Foreign Application Priority Data

| | | |
|---|---|---|
| Jan. 9, 1975 | Germany | 2500706 |
| Apr. 18, 1975 | Germany | 2517204 |

[51] Int. Cl.[2] .......... B29C 15/00; B29J 5/10

[52] U.S. Cl. .......... 425/371; 100/151

[58] Field of Search .......... 425/101, 102, 335, 371, 425/394; 264/109, 112, 113; 144/281; 100/93 RP, 118, 151, 152, 153, 154; 156/583

[56] References Cited

U.S. PATENT DOCUMENTS

| | | | |
|---|---|---|---|
| 2,554,968 | 5/1951 | Thompson | 100/154 |
| 3,223,027 | 12/1965 | Soda et al. | 425/371 |
| 3,851,685 | 12/1974 | Ahrweiler et al. | 100/154 |
| 3,887,318 | 6/1975 | Demets | 425/371 |

FOREIGN PATENT DOCUMENTS

| | | | |
|---|---|---|---|
| 4,617,555 | 4/1967 | Japan | 100/154 |

*Primary Examiner*—Robert L. Spicer, Jr.
*Attorney, Agent, or Firm*—Kenyon & Kenyon, Reilly, Carr & Chapin

[57] ABSTRACT

An improved continuous press of the type having two rotatively driven endless conveyor belts forming opposed, substantially linear spans defining a press zone with support structures applying pressure through the travelling belts to work carried therebetween, in which a plurality of sets of individual roller chains closely following each other in longitudinal direction are disposed between the support structures and the conveyor belts.

9 Claims, 5 Drawing Figures

PRESS FOR EXERTING FLAT PRESSURE

BACKGROUND OF THE INVENTION

This invention relates to presses of the type wherein two support structures apply forces to two rotatively driven conveyor belts with roller chains disposed between the support structures and the belts in general, and more particularly, to an improved press of this nature using a plurality of groups of roller chains arranged sequentially in the longitudinal direction.

A press of this general nature is disclosed in U.S. Pat. No. 3,851,685, the disclosure of which is hereby incorporated by reference. The press disclosed in this reference is a continuous press for the manufacture of wood, chipped wood or the like in which the material to be treated is moved continuously between two flexible endless conveyor belt spans. Between the belt spans forming the press zone and corresponding press platens, a plurality of rotatively upowered endless loops of roller chains are used, these roller chains being packed transversely together to form a bed interposed between the platens and the seal strip conveyor belts. The press platens in turn are positioned between support constructions comprising beams, each positioned transversely to the movement of the belts with portions of such beams extending longitudinally above and below the press platens for the length of a press.

A press of this nature may have a longitudinal pressing section over which force is to be exerted which extends for ten meters or more. In such a case, the roller chains used must have a length which is more than double that length. Such long chains are not easy to manipulate and during running may be subject to substantial stresses.

In view of this problem, the need for a press of the general nature of that described above which does not require uninterupted chains running over its entire length becomes evident.

SUMMARY OF THE INVENTION

The present invention provides a solution to this problem. In accordance with the present invention, the problem is solved by dividing the roller chain arrangement not only transversely but also in the longitudinal direction. In other words, what was formerly a single long chain is divided into a number of closely following independent, endlessly circulating individual roller chains. Through these measures the individual roller chains need no longer extend over the entire longitudinal section. Instead, the total length is covered by a sequence of shorter roller chains. In this way, during the replacement and insertion of roller chains, the work is limited to a shorter portion of the longitudinal section. In addition, the possibility of the roller chains being overstressed is diminished. This results directly from the fact that differences in running within the apparatus do not stress the chain over the entire length of the section being pressed but only over the shortened distance in the area under consideration. Furthermore, since the individual chains are designed to follow one another closely in the longitudinal direction, and the roller diameter of these chains is approximately 10 to 20 mm, the gap between rollers is shortened to a few centimeters. These short traverse regions in which no support is present have no significant influence on exertion of pressure and the transmission of heat as will be explained in detail below. In fact, under certain circumstances this arrangement has advantages and it may further advantageous to increase the spacing in the longitudinal direction between sequential roller chains up to, for example 10 to 20 cm.

In one form of construction of the press utilizing a supporting structure having individual cross beams extending transversely across the strip, it is advantageous for the operative region of a single roller chain to extend over a portion of the longitudinal region corresponding to one or more sequential cross beams. This has a constructional advantage permitting the means for guiding the chains in the forward direction to correspond in length to the cross beams so that no overlapping occurs. In such an arrangement it is desirable that at least one of the abutments between two sets of transversely packed chains as viewed in the lengthwise direction, be suituated at the same location. In this manner a clearance between roller chains is produced across the strip.

An important aspect of the division of the roller chains in the longitudinal direction is that the spacing of the lengthwise operating regions are such that the conveyor belts, also known as forming bands, at the unsupported portion between the roller chains, under the counter of the pressure material being pressed, are able to bulge out to the extent that any steam existing in the material being worked can escape laterally. The bulging out need only be just sufficient to open labyrinth type venting paths in the mass of wood chips, for example, to permit a lateral flow-off of the steam. Steam left locked in the strip of material would, because of the great effective area, require that the press be designed to exert a greater pressure to make up for this extra load. Through the intermittent release of the forming band along a certain distance, a relief of the load is obtained in a simple way permitting the pressing force to work entirely on compression of the wood chip mass.

A further advantageous form of construction of the present invention comprises placing, between the cross beams and the endless forming bands, press platens on the side toward the strip of material and placing return travel platens on the side next to the cross beams. In this arrangement, the roller chains roll along in the forward direction against the pressure platens and return through the return platens. The return travel platens have a thickness exceeding double the roller diameter. In addition, they have alternately on their upper side and underside grooves of a depth corresponding to the roller diameter and of a width corresponding to the roller width. The edges of adjacent grooves are superimposed on a longitudinal plane perpendicular to the strip.

An arrangement such as this for operating over a length extending over the entire pressing distance is also shown in the aforementioned U.S. Pat. No. 3,851,658. Such an arrangement permits both the operative length of roller chains, which roll along between the pressure platens and conveyor belts transmitting pressure and, on occasion heat, and also the returning length, to be disposed below the cross beams. In this manner the returning length runs through the grooves. The design and dimensioning of the return travel plates permits properly guiding the roller chains which abut directly against one another in the transverse direction on the other side of the platen. The arrangement avoids temperature variations of the chains during circulation since the roller chains remain at the desired temperature at the bottom region of the cross beams. It also facilitates isolating the chains from contaminants.

An important form of construction of the present invention, possible only through a division of the roller chains in a lengthwise direction, resides in the ability to laterally offset sequential roller chains from one another in the direction of travel of the strip. This insures that the lanes or areas between individual roller chains in one section which are without support or the gaps formed where links are present will be rolled over by roller in a following group. In this manner, the total surface of the material being worked is rolled by the roller chains. The end result is the avoidance of strip-like markings on the finished sheet of material which could be caused by the uneven transmission of pressure or heat in certain cases.

DETAILED DESCRIPTION OF THE PREFERRED EMBODIMENT

Figure 1:
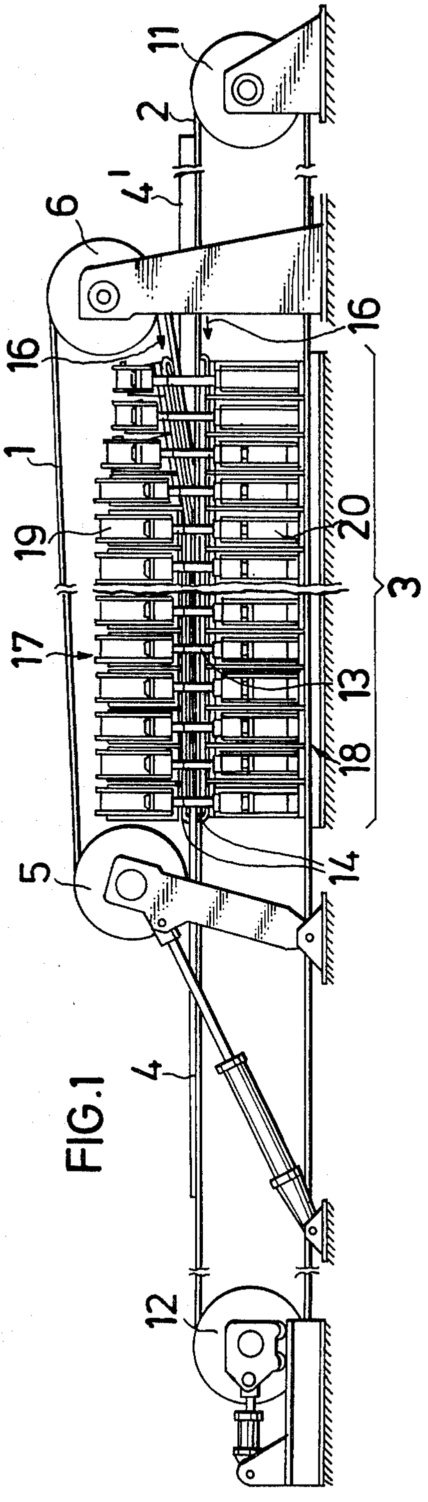
FIG. 1 is a side elevation view of a continuous press in which the present invention is employed.
Figure 2:
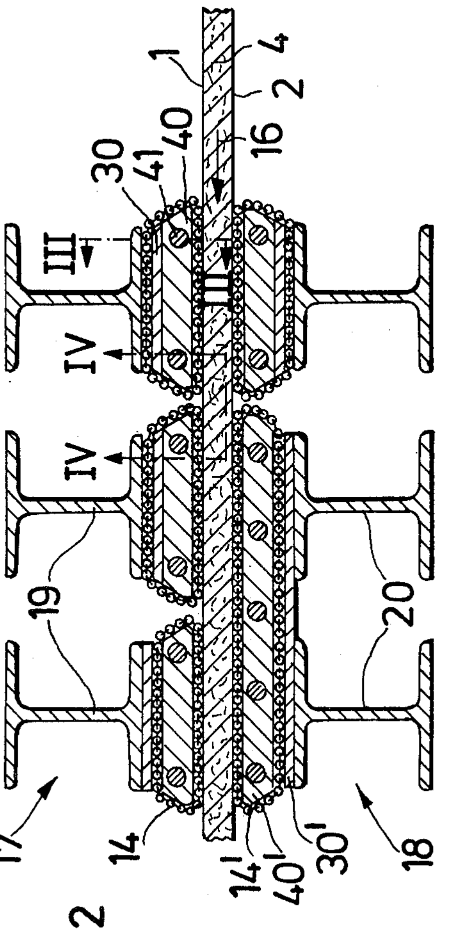
FIG. 2 is a partial section through the press of FIG. 1 in greater detail.

FIGS. 1 and 2 show the upper and lower endless conveyor belt loops 1 and 2 respectively, which form opposed, substantially linear spans defining the pressing zone embraced by the bracket 3. These belts are made of thin strip steel having a thickness of about 1 to 1.5 mm and are flexible both longitudinally and transversely. The upper belt 1 is looped around rotative drums 5 and 6. The lower belt 2 at one end loops around a rotative drum 11 with the other end of this lower loop passing around a rotative drum 12.

The work 4 enters at the righthand end of the press in FIG. 1 as loose material 4' and comes out the lefthand end with a reduced thickness moving in the direction of arrow 16 of FIG. 2.

The working spans of the two belts in the zone 3 are supported by support structures 17 and 18. The lower support structure 18 includes individual supports such as transverse I-beams 20 supported by base members which extend longitudinally for the length of the press. The upper support structure 17 includes individual supports such as transverse I-beams 19 which can be pulled downwardly by suitable actuators. e.g. hydraulic units, located outside the strip of work 4.

Between the respective cross beams 19 and 20 and the belts 1 and 2 are disposed return travel platens 30 and press platens 40. The return travel platens are on the side closest to the beams 19 and 20 and the press platens 40 are on the side closest to the belts 1 and 2. This arrangement is illustrated on both FIGS. 2 and 3. The press platens include heating channels 41 through which a heating medium can be conducted to bring the press platens 40 to a higher temperature. The press platens 40 have a smooth underside along which roller chains 14 roll and transmit the pressure produced by the cross beams 19 and 20 and, if used, the heat of the press platens 40 to the belts 1 and 2. The roller chains 14 comprise cylindrical rollers connected at their sides or inside by links. The links, of course, have a height less than the diameter of the roller. The roller chains are endless and return by running back through the return travel plates between the press platens 40 and the cross beams 19 and 20 to return to the beginning of the press platens 40. Thus, there is an endless circulation of the roller chains 14 in an area between the cross beams 19 and 20 and their associated conveyor belts respectively.

Figure 3:
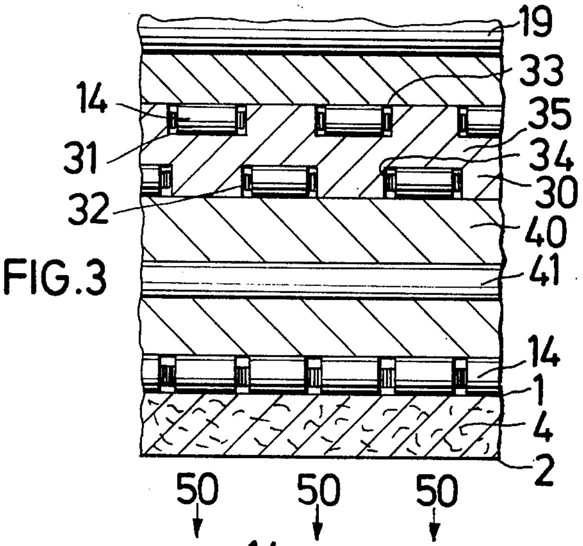
FIG. 3 is a partial section along the line 3—3 of FIG. 2 in an enlarged scale.

The design of the return travel platens 30 is shown in in detail in FIG. 3. In a direction parallel to the direction of advance 16 of the strip of material 4, grooves 31 and 32 are formed disposed alternately on the outside of the return travel platen next to the cross beam 19 and on the inside of the return platen 30 next to the press platen 40. The grooves 31 and 32 have a width corresponding to the width of the roller chains 14 and a depth corresponding to the diameter of the roller chains 14. The facing edges 33 and 34 of the grooves 31 and 32 are approximately superimposed on a longitudinal plane perpendicular to the strip 4. The thickness of the return travel platen 30 exceeds twice the diameter of the roller chains 14 so that, between these facing edges 33 and 34 of adjacent grooves, a region 35 through which a pressure forces can be transmitted will remain. In this manner, the returning lengths of roller chains 14 can directly abut on the sides of the press platens 40 which are turned toward the conveyor belts or forming bands 1 and 2.

In accordance with the present invention, a plurality of sets of roller chains are provided rather than using a single set over the entire pressing zone 3 of FIG. 1. As shown on the top of FIG. 2, there is associated with each of the beams 19 a separate set of roller chains 14. On the bottom of FIG. 2 a single set of roller chains 14' are shown associated with two of the beams 20. With the arrangment shown on the top of FIG. 2, the conveyor belts 1 and 2 are supported, in the lengthwise section 3, by a plurality of pairs of cross beams 19 and 20 having a sequence of endless circulating roller chains 14. As noted, the roller chains can extend over more than one I beam as shown by the roller chain 14' on the lower lefthand side of FIG. 2. In this case, there is associated with it a longer press platen 40' and a longer return platen 30'.

The junction between subsequent roller chains 14 and 14' are all situated, as view on the longitudinal direction at one position. That is to say sequential roller chains always end or begin at the same cross beam so that a continuous gap exists the across the width of the strip. Suitable elastic elements may be provided in the illustrated arrangement for tensioning the individual, relatively short roller chains 14 and 14'.

Figure 4:
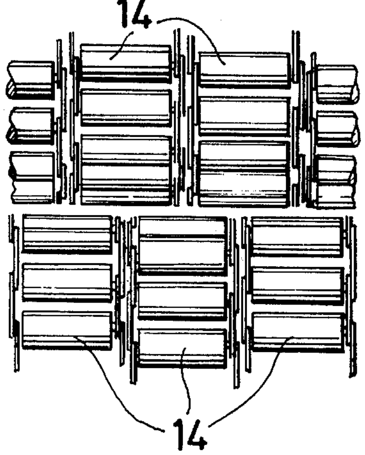
FIG. 4 is a plan view of the chain arrangement taken along the line 4—4 of FIG. 2.

FIG. 4 illustrates an important form of construction of the present invention. The chains illustrated on FIGS. 3 and 4 are of a conventional design. It should be noted that it is also possible to use the various types of chains disclosed in the aforementioned U.S. No. 3,851,685. The chains shown on FIGS. 3 and 4 have interior lanes 50 where they are joined by links at which point no pressure will be applied. Various ones of the chains described in the aforementioned patent have gaps internally between links. In any case, lanes 50 can occur in which no pressure is applied. i.e. lanes which are free of support. In these lanes no heat or pressure will be transmitted. Thus, if the roller chains extend over the full length of the pressing section 3 the finished product can end up with raised strips thereon which require further processing to form a smooth product.

By subdividing the roller chain arrangement into a number of separate roller chains 14 in sequence, it becomes possible to offset the roller chains laterally relative to one another so that, for example, the support free lanes 50 in FIG. 4 are rolled over by the roller chains 14 in the lower portion of the figure as the strip of material 4 advances. An irregularity which might be formed is thus limited to the length of a single roller chain arrangement 14. In this way, a uniform rolling of the conveyor belts 1 and 2 is obtained in the pressure applying section 3.

Figure 5:
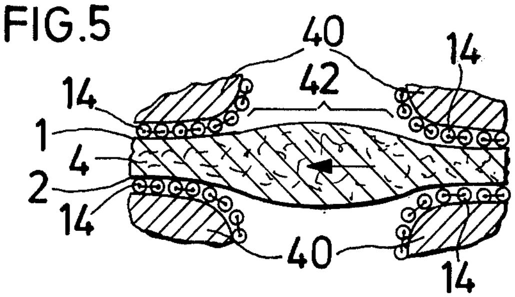
FIG. 5 is a schematic illustration of the point of abutment between two sequential roller chain arrangements.

FIG. 5 illustrates schematically a portion of a section between roller chains 14 which follow one another in the lengthwise direction of the strip of material 4. The press platens 40 and thus also the region in which the roller chains 14 bear against the conveyor belts 1 and 2 have a space in the lengthwise direction of the strip. This results in a zone 42 in which the conveyor belts 1 and 2 are not supported from the outside. Because of this they bulge out as shown on FIG. 5. The bulging is, of course, exaggerated in the figure. In actuality, with the usual thickness of the plates, it amounts to only a few tenths of a millimeter. The mass of wood chips in the strip of material, for example, become loosened to the extend that steam can easily escape laterally. The size of the space between successive press platens and thus the length of the zone 42 depend on the nature of the mass of wood chips or other material being processed, on the pressures, and also on the thickness of the strip of material 4. Under normal conditions an interval of approximately 100 to 200 mm exists. With steam pressures in the range of 2 to 3 atmosphere this results in a good lowering of steam pressure. If measures have been taken to maintain a certain size of interval betwen sequential press platens 40, it is naturally preferable to end all chains 14 adjacent to one another over the width of the strip of material at the same position in the lengthwise direction of the strip 4 so that the zone 42 is continuous across the width of the strip.

Thus, an improved press has been shown. Although specific embodiments have been illustrated and described, it will be obvious to those skilled in the art that various modifications may be made without departing from the spirit of the invention which is intended to be limited solely by the appended claims.

I claim:

1. In continuous press which extends in the longitudinal direction including endless loops formed by longitudinally and transversely flexible conveyor belts which form opposed, substantially linear traveling spans moving in the longitudinal direction and defining a pressing zone, support structures applying pressure through said traveling spans to a strip of work carried therebetween and antifriction means in the form of multiplicity of endless loops of rotatively unpowered roller chains forming a bed of roller chain spans interposed between said support structures and said traveling spans, said roller chain spans extending in the longitudinal direction and being transversely packed together but each chain loop being individually free to travel independently with respect to the other loops of said multiplicity and said traveling spans, the improvement comprising said roller chains spans divided in the longitudinal direction of the press into a plurality of groups of closely following independent, endlessly circulating individual roller chain groups each having a plurality of transversely packed loops of roller chains individually free to travel independently.

2. A press according to claim 1 and further including press platens disposed between said chains and said support structures.

3. A press according to claim 2 and further including means for heating disposed within said press platens.

4. A press according to claim 2 and further including return travel platens disposed between said press platens and said supporting structure, said return travel platens having a thickness more than double the roller diameter and having a plurality of grooves therein formed alternatively in the top and bottom of said plate said grooves having a depth corresponding to the roller diameter and a width corresponding to the roller width with the edges of adjacent grooves superimposed approximately on a longitudinal plane perpendicular to the strip of material.

5. A press according to claim 1 wherein said support structure comprises a plurality of cross beams extending across the strip of work following one another individually in the direction in which the strip of work is moved and wherein each of said groups of roller chains extends over a lengthwise section corresponding to an integral number of cross beams.

6. A press according to claim 5 in which in at least one place within the pressing zone all intervals transverse to the strip of work and between adjacent roller chains are situated at the same position when viewed in the lengthwise direction.

7. A press according to claim 6 wherein the spacing between sequential roller chain groups within the pressing zone are selected so that the conveyor belts, under the counter pressure of the work, are able to bulge out to the extent necessary to permit steam to escape laterally from the work.

8. A press according to claim 5 wherein the spacing between sequential roller chain groups within the pressing zone are selected so that the conveyor belts, under the counter pressure of the work, are able to bulge out to the extent necessary to permit steam to escape laterally from the work.

9. A press according to claim 1 wherein the roller chains in sequential groups of chains in the direction in which the work is moving are offset laterally from one another.

* * * * *